April 7, 1970     D. T. BRAY     3,504,796

REVERSE OSMOSIS APPARATUS

Filed Aug. 1, 1968     2 Sheets-Sheet 1

INVENTOR.
Donald T. Bray

BY

Agent

INVENTOR.
Donald T. Bray

United States Patent Office 3,504,796
Patented Apr. 7, 1970

3,504,796
REVERSE OSMOSIS APPARATUS
Donald T. Bray, Escondido, Calif., assignor to Desalination Systems, Inc., San Diego, Calif., a corporation of California
Filed Aug. 1, 1968, Ser. No. 749,447
Int. Cl. B01d 13/00
U.S. Cl. 210—137                                11 Claims

ABSTRACT OF THE DISCLOSURE

Reverse osmosis apparatus employing a membrane pack or module wound around a perforated tube inside a pressure container, and from which container brine is released through a conduit formed by a spiral groove in the face of a plug which is maintained in contact with another surface. The spiral groove is of such length and diameter so that the conduit offers resistance to flow of brine to regulate its release from the container and to maintain liquid pressure therein. A plurality of two or more grooved face plugs may be employed to form an extended conduit for desired control. The perforated tube around which the membrane pack is wound may contain a water purifying material and the outlet of such tube may be equipped with a collapsible plastic tube valve to shut off water flow if membrane rupture occurs.

---

This invention relates to apparatus for purifying a liquid or solution by reverse osmosis.

The principles of reverse osmosis are now becoming well recognized. An impure solution is applied at elevated pressure to one side of a semipermeable membrane and employment of suitably high pressure results in purified solution being forced through the membrane, with concurrent production of a solution more concentrated with respect to salts originally contained in the impure solution and termed brine. Several types of apparatus are being used and have been proposed for purifying or concentrating solutions by reverse osmosis. In general, a suitable membrane support is employed which will provide a proper membrane surface for contact with the impure solution and means for supporting the membrane while allowing flow-through of purified product water. A control valve or regulator is employed to regulate the flow of solution through such a system, to insure a flow of liquid and outflow of brine, while maintaining operating pressure of the feed solution at the membrane working face. A filter for treatment of the impure feed solution is advantageously employed to protect the membrane, and a final purifying (polishing) system for the product water will produce the best and most palatable water product.

Heretofore the various elements constituting a reverse osmosis purifying system have been separate and connected for use as desired. This has required assembly of such a system from its components, and plumbing and connecting the various units together. Such a built-up system is obviously disadvantageous for many applications of reverse osmosis; for example in production of purified drinking and cooking water for household use, where a simple and compact purifier would be a necessity.

Summarized briefly, this invention provides a unitary reverse osmosis purifying unit, for purifying water for example, which is efficient yet compact, and in which the membrane module and a simple but effective flow regulator are designed to fit and operate inside a common tubular casing, which may also contain a feed water filter and product water treatment material, as well as a product water safety valve which can protect the product output in case of membrane rupture. A membrane pack is employed, and brine flow control is obtained by passing the brine or concentrated solution through a conduit formed by the grooved face of a plug contacting the surface of an adjoining system element, for example, the back face of an end piece. A feed filter is arranged inside the casing, the product water treatment material and the product water safety valve are located within the membrane module central tube.

Details of construction and operation of the apparatus of this invention will become apparent from the following description and the annexed drawings in which.

Figure 1:
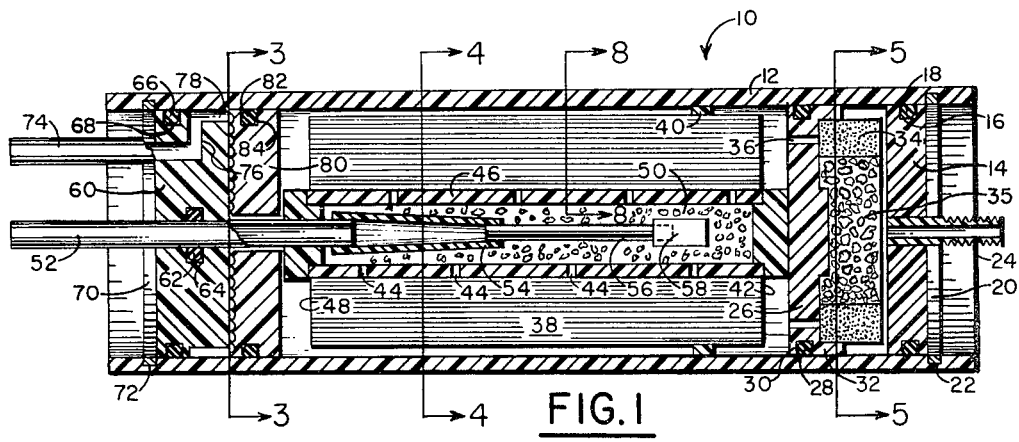
FIG. 1 is a central vertical section of a purification unit embodying features of this invention.
Figure 2:
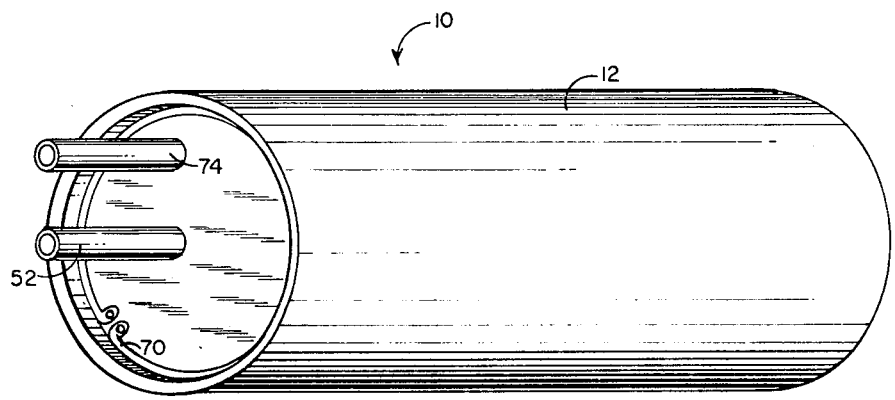
FIG. 2 is a general perspective view of the purification unit of FIG. 1.
Figure 3:
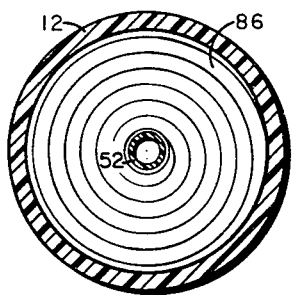
FIG. 3 is a vertical cross section of the unit of FIG. 1 taken along the line 3—3.
Figure 4:
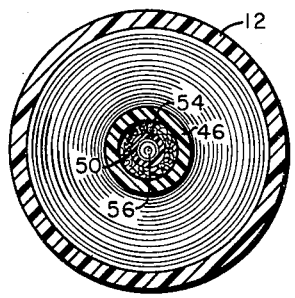
FIG. 4 is a vertical cross section of the unit of FIG. 1 taken along the line 4—4.
Figure 5:
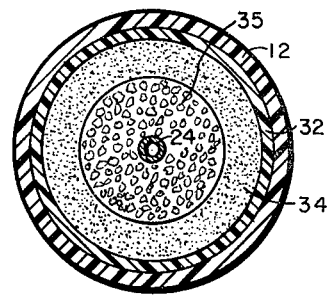
FIG. 5 is a vertical cross section of the unit of FIG. 1 taken along the line 5—5.

Referring now particularly to FIGS. 1 to 5, the purification unit 10 comprises an outer casing 12 which is pressure resistant and may conveniently be fabricated of high strength plastic. The right-hand or inlet end of casing 12 is closed by end piece 14 having a circumferential groove 16 into which fits O-ring 18 to seal end piece 14 to the wall of casing 12. Snap ring 20 fitting into its groove 22 in the interior wall of casing 12 holds end piece 14 in position as shown. An inlet connection 24 is provided which passes through end piece 14 and communicates with the interior of casing 12. Plate 26 is also positioned inside casing 12 and is sealed to the inner wall thereof by O-ring 28 in groove 30. Plate 26 is provided with extending rim 32 which forms a socket into which is fitted a short tubular filter element 34, which may be fabricated, for example, of porous cellulosic material. The hollow space inside tubular filter 34 may advantageously contain some granular, slow dissolving water treatment or purifying chemical, for example, a polyphosphate for pH control, indicated at 35. Passing through plate 26 in the way of the edge of filter element 34 are transfer holes 36 through which feed solution entering through connection 24 and after passing through filter element 34 is transferred to the interior of casing 12.

A membrane module 38 is disposed inside casing 12 as shown, passage of feed water around its sides being prevented by gasket 40 which may be of felt or other soft plastic material. Module 38 is composed of a spirally wound membrane, backing sheet and screen sandwich whose construction and operation has been referred to in 1965 Saline Water Conversion Report of the U.S. Department of Interior, Office of Saline Water, and which will be described hereinafter in some detail. Impure feed water enters module 38 through its right-hand edge 42 and as it passes longitudinally therethrough, purified water is separated by the membrane action and is transferred through holes 44 in tube 46 around which the membrane pack of module 38 is wound. Brine, or water concentrated in the impurities or salts separated by the membrane in module 38, flows out of the module through its left-hand end 48.

The interior of tube 46 is arranged advantageously to contain a water purifying agent, which may for example be activated carbon in granulated form as at 50. The ends of tube 46 are sealed by conventional end pieces maintained in place by a suitable adhesive, the left-hand end as shown being pierced by product water delivery pipe or tube 52 which projects some short distance into the interior of tube 46. Fastened around the interior end of tube 52 is a length of soft plastic tubing 54 which will normally remain open but which will collapse under pressure to act as a shut-off valve. Preferably at the end of tubing 54 is affixed a length of relatively stiff, small diameter tubing 56. The end of tubing 56 is capped with a filter closure as at 58. For illustration of suitable materials for fabrication of these elements, tubing 54 may be of plasticized vinyl, tubing 56 may be of nylon, and filter 58 may be of the same type and construction as employed in a cigarette filter. This it will be seen that water having passed through the membrane in pack 38 and into the interior of tube 46 through holes 44 is further purified by contact with granulated purifying agent 50. It then passes through filter 58, which functions principally to keep detached particles of activated carbon or purifying agent from plugging the entrance of tubing 56. Passing through tubing 56, then through tubing 54, the water flows out of product water delivery tube 52 which may be connected in any convenient manner, not shown, to piping or plumbing for delivery to point of use.

The left hand end of casing 12 is sealed by end piece 60 which, like other elements of the apparatus described, may be fabricated of strong plastic. Thus casing 12 with end pieces 14 and 60 form a pressure resistant container in which is contained membrane pack 38. Product water delivery tube 52 is sealed where it transfixed end piece 60 by O-ring 62 set in groove 64, and the periphery of end piece 60 is sealed to the interior of unit 12 by O-ring 66 in rgoove 68. End piece 60 is maintained in position in closing 12 by snap ring 70 in groove 72.

End piece 60 is provided with brine outlet pipe 74 which communicates with an interior conduit 76 which in turn communicates with the annular edge space 78 between end piece 60 and the interior of casing 12. The interior vertical surface of end piece 60 is plane as shown. Abutting against end piece 60 is plug 80 whose outer edge is sealed to the inner wall of casing 12 by O-ring 82 in groove 84. Product delivery tube 52 passes loosely through a central bore in plug 80. The left-hand face of plug 80 is formed having a spiral groove 86 as shown more clearly in FIG. 3 which, when contacting the plane back face of end plate 60 forms a spiral conduit which communicates at its inner end with the bore in the center of plug 80 where delivery tube 52 passes through, and at its outer end with outer edge space 78 between end piece 60 and the adjacent wall of casing 12. The diameter of groove 86 has been shown somewhat enlarged for purposes of illustration and will, in practice, be relatively small to produce a suitably small diameter, elongated conduit capable of providing the required resistance to regulate flow and maintain water pressure within the container.

In the case of the embodiment illustrated in FIG. 1, the brine flowing from the edge 48 of membrane pack 38 flows through the central space between the product tube 52 and the internal bore of plug 80, then through the elongated conduit formed by the spiral groove 86 and the contacting face of end plate 60, out through the annular 78 space between the inside of the case 12 and edge of end piece 60, and thence through connecting channel 76 to brine outlet pipe 74. The pressure of water against the back of plug 80 holds its grooved face tightly against the plane back face of end piece 60.

Figure 6:
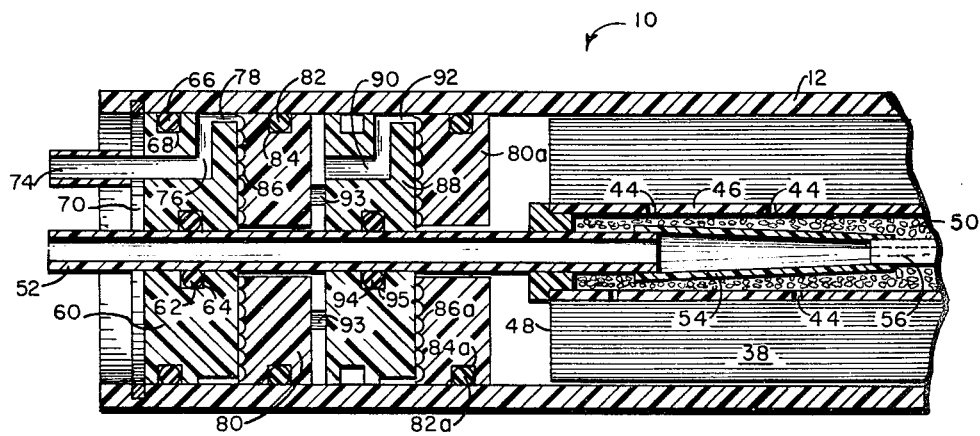
FIG. 6 is a fragmentary, central vertical section of a purification unit having a plurality of two plugs with grooved faces for brine release control.

In FIG. 6 is shown an alternative embodiment of this invention in which a plurality of two grooved face plugs are employed to control the brine outflow from the unit. In this modification a somewhat shorter membrane module 38, or longer casing 12, are employed to provide room for an additional flow control plug. As will be seen, the end closure arrangement is the same as that shown in FIG. 1 with end piece 60 held in place by snap ring 70 and the grooved face 86 of plug 80 being in contact with the interior plane surface of end piece 60 to form a flow control conduit. An additional grooved face plug or plugs may be arranged to provide series connected conduits using various modifications to insure contact of the lands in the grooved faces with matching facing surfaces to form the conduits, and with provision for brine flow in and out of the so formed conduits. In the embodiment of FIG. 6, an additional end piece 88 is employed which is similar to end piece 60 except that it does not have attached brine outlet pipe 74 but it does have similar channel 90. In order to provide flow from annular edge space 92 through channel 90 to space at the central bore of plug 80, spacers 93 are attached as by glueing to the face of end piece 88. Since water flow around the edge of piece 88 will do no harm an O-ring similar to 66 in end piece 60 may be omitted, but O-ring 94 in groove 95 is provided to seal 88 around tube 52. Behind end piece 88 and in the same relative position as plug 80 bears to end piece 60, is another similar grooved faced plug 80a provided, like plug 80, with outer sealing O-ring 82a in its groove 84a and having a grooved face 86a. With plugs 80 and 80a in place as shown, and with water under pressure in casing 12 to insure pressure contact between these elements and end pieces 60 and 88, brine will flow from the edge 48 of module 38 through the central bore bore of plug 86a, through the conduit formed by the grooved face of plug 80a and the back face of end piece 88, then out at the periphery thereof and through annular edge space 92, channel 90, the space between end piece 88 and plug 80, and through the central bore of plug 80 and through its grooved face conduit, and finally out through annular edge space 78, channel 76 and brine outlet pipe 74. With the conduits formed by the grooved faces in plugs 80 and 80a thus connected in series, substantially greater resistance to brine flow results. An advantage of the organization such as illustrated in FIG. 6 in which the facing surface for the second grooved face plug is formed by the internal or back surface of another end piece or modified end piece is that no additional different parts are required to arrange for the multiple groove face conduit. Only a simple attachment of spacers 94 enables the same type of basic end pieces and grooved face plugs to be employed.

Figure 7:
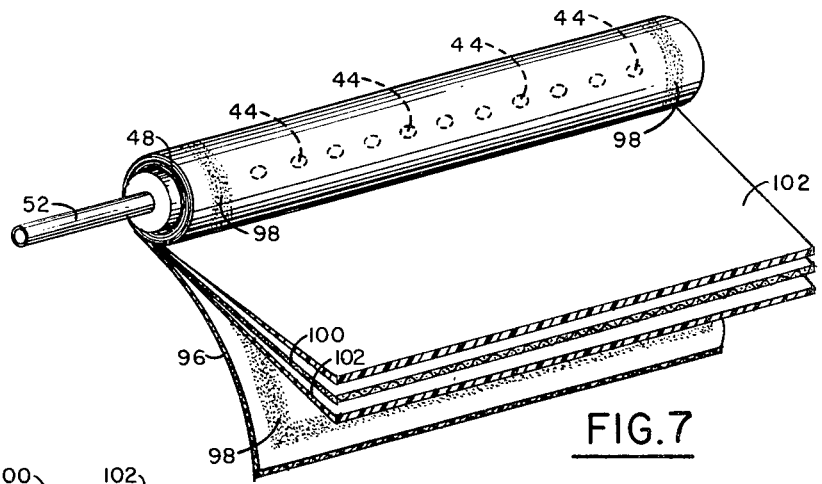
FIG. 7 shows in some detail the membrane pack or module partially unwound.
Figure 8:
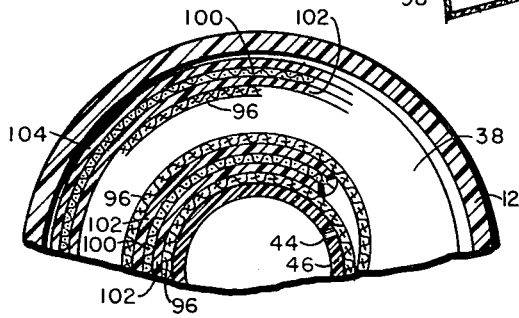
FIG. 8 is an enlarged, fragmentary vertical cross section of the membrane module taken along the line 8—8.

Construction of the membrane module 38 will be more clearly understood by reference to FIGS. 7 and 8. As will be seen in FIG. 7 central tube 46 extends through the length of the pack and is perforated at intervals as at 44 to provide porosity in the area under the membrane pack. Around tube 46 is first wound the end of a length of porous fabric 96, at least one full turn being placed around the tube. Fabric 96 is advantageously formed of a base of porous sheet material with fine glass beads attached to its surface. The extending length of fabric 96 has a band of suitable adhesive laid around or near the edges as at 98, this band also running adjacent the turn of fabric 96 around tube 46. The adhesive in band 98 soaks through porous fabric 96 to provide glueing surfaces on both sides. Then a sheet of plastic screen 100 is placed between the inner surfaces of length of doubled over membrane 102 as will be seen more clearly in FIG. 8. The inner surfaces of membrane 102, that is those next to screen 100 are the active membrane surfaces and will face the incoming water to be purified. Then the crease of the folded membrane 102 with interleaved plastic screen 100 is inserted in the nip between extending porous fabric 96 and covered tube 46, and the assembly wound up to form a spiral pack. As the pack is wound and formed, the porous fabric 96 becomes glued on each side to faces of membrane 102. As the final turn is taken, the end of the outer layer of membrane 102 is overlaid on the end of porous fabric 96, and plastic screen 100 is wound over to form the outer layer of the pack, the complete module organization being maintained intact by outer plastic tape winding 104.

In FIG. 8 is shown an enlarged fragmentary view of the membrane module as it appears in vertical section.

Tube 46 is shown with one of its perforations 44, and around this a layer of porous fabric 96, then a layer of membrane 102, then a layer of plastic screen 100 and then another membrane layer 102 followed by another layer of porous fabric 96 with the sequence repeated to form the spiral wound pack of desired membrane area. As previously described the rolled pack is arranged with screen 100 as its outer layer and this all held in place by tape winding 104.

The semipermeable membrane 102 is fabricated of material possessing the requisite properties, principally adequate flux or flow through, and selectively or salt rejection. Materials which have been found advantageous are cellulose acetate films such as disclosed in Loeb et al. U.S. Patent 3,133,132 and 3,133,137 and Manjikian et al. U.S. Patent 3,344,214. Other materials may, however, be employed to obtain required semipermeable properties.

In operation of a purification unit according to this invention, an impure water supply line may be connected to inlet fitting 24. This may be a hose or plumbing connection to a domestic water supply if it is desired to purify such domestic supply to provide a purer grade of water for example, for drinking and cooking. Product outlet 52 is connected, as for example by plastic tube, to a suitable container for accumulating a supply of purified water, and brine outlet 74 is connected in any suitable manner to drain or sewer. The pressure of a normal domestic water suply, that is from about 50 to 100 pounds per square inch, will be sufficient to cause a flow of water through the membrane pack 38 with purified water passing through the membrane 102, flowing through holes 44 in tube 46 and into the interior of tube 46 which it contacts purifying carbon granules 50 and then flows through filter 58, tubes 56 and 54, to product water outlet 52. The brine outflow is controlled as described above by directing its passage through one or more elongated conduits formed by a spirally groved plug face or faces as 86 in plug 80 in FIG. 1. Thus pressure is maintained inside case 12 to provide proper driving force for reverse osmosis and purification of the impure feed water, while a regulated amount of water more concentrated in removed salts, and termed brine, is allowed to outflow through brine outlet 74. A small unit as described is capable of producing several gallons per day of water in the range of 50–200 p.p.m. total dissolved solids from a somewhat unpalatable household supply containing for example up to 800–1000 p.p.m.

The spirally grooved plug face provides a simple yet efficient method of obtaining an elongated and restricted flow path for outflowing brine. Such a spiral groove, of requisite small diameter when fitted snugly against an opposite flat face of an end closure plate, or the back face of another spirally grooved plug, or other suitable facing surface, forms an enclosed conduit of substantial length through which the brine must pass. Or, obviously, the same effect and result may be obtained by putting the spiral groove in the end closure internal face which can function as a grooved surface plug when abutting a facing surface of another plug or element of the assembly. Employment of one or a plurality of spirally grooved plugs provides a convenient method of controlling the brine outflow to give a greater or less brine-to-product water ratio as desired for the particular feed water being purified, and the purity desired in the product water. The spiral groove facing a flat face in the output end of the unit automatically insures a tight seal between the lands on the grooved face and its facing surface since the water pressure inside the unit casing holds these elements very tightly together. It is advantageous if one of the elements is sufficiently thin or flexible to allow it to deform slightly under the applied pressure to insure desired contact and fit.

The plastic tube valve in the interior of porous tube 46 and arranged to collapse and shut off flow through the product tube 52 in event of membrane rupture is effective to prevent flooding of the pure product water overflow drain line if membrane rupture occurs. Use of the space inside tube 46 to contain granular purifying material provides a simple, effective method of contacting product water which has been passed through the module and has had salts removed by reverse osmosis. Contact with activated carbon for instance, can further improve product water quality and taste. Because the water has already been purified only small amounts of these "polishing" materials are needed.

The apparatus of this invention provides a reverse osmosis water treating unit which is completely self-contained with its feed water filter, the membrane module, the flow regulator for brine, the product water treatment material and the product water outlet tube safety valve all efficiently and compactly arranged within a unitary pressure resistant container. The grooved face plug or plugs for brine flow rate regulation are extremely simple and yet very efficient, and a plurality of grooved plugs can be employed for greater flow resistance if desired or necessary. At the same time the unique construction in which all the elements are housed in a tubular container and held in such tube by snap rings permits ready disassembly for removal and replacement of the membrane module, the feed water filter, and the product filter and purifying agent, when required.

I claim:

1. Reverse osmosis apparatus comprising a membrane pack within a pressure resistant container, means for introducing impure liquid under pressure into one end of said container and into one end of said membrane pack, means for releasing brine from the other end of said membrane pack and said container, and a tube through which purified liquid is withdrawn from said membrane pack, in which the improvements comprise: said brine releasing means including a plug having a spiral groove in a face adapted to be pressed against a facing surface to form an elongated conduit through which said brine to be released is directed, the so formed conduit being of length and diameter to regulate the release of said brine and to maintain liquid pressure in said container.

2. Apparatus according to claim 1 in which said brine release means include a plurality of at least two plugs each having a spiral groove in a face thereof, said spirally grooved faces being adapted to be pressed against facing surfaces to form connected elongated conduits, and so-formed conduits being of length and diameter to regulate the rate of release of brine directed therethrough and to maintain liquid pressure in said container.

3. Apparatus according to claim 2 in which a plurality of two plugs are arranged with their grooved faces respectively facing the internal plane face of a casing end piece, and the corresponding flat face of a similar end piece interposed between the two grooved face plugs.

4. Apparatus according to claim 1 in which said brine releasing means include a plug in said container, an end piece sealing one end of said container having an interior face against which a face of said plug is pressed by liquid pressure in said container, at least one of said interior face of said end piece and said face of said plug having a spiral groove therein to form by contact with the other an elongated conduit through which said brine is directed, said conduit being of length and diameter to regulate the rate of release of said brine and maintain liquid pressure in said container.

5. Apparatus according to claim 4 in which a delivery pipe is connected to the interior of the membrane pack to provide for withdrawal of purified water therefrom, said delivery pipe transfixing said end piece in sealing engagement therewith and loosely passing through said plug, and a brine release pipe connected through a channel in said end piece to the outer edge of the spirally grooved face of said plug.

6. Apparatus according to claim 1 in which said tube through which purified liquid is withdrawn from said membrane pack contains granular liquid puirfying material.

7. Apparatus according to claim 6 in which said granular liquid purifying material is activated carbon.

8. Apparatus according to claim 1 in which an elongated tube of soft, flexible plastic is attached to the inner end of the tube through which purified liquid is withdrawn from said membrane pack, said inner end being inside a porous central tube around which said membrane pack is wrapped, said soft flexible plastic tube being normally open but being collapsible to shut off water flow therethrough in the event of a break in the membrane resulting in high volume, high pressure water flow into said porous central tube.

9. Apparatus according to claim 8 in which a smaller diameter tube of stiff material is affixed to the interior end of said soft, flexible plastic tube, said soft flexible plastic tube being normally held open by said stiff plastic tube but being collapsible to shut off flow therethrough in the event of a break in the membrane resulting in high volume, high pressure liquid flow into said porous central tube.

10. Apparatus according to claim 1 in which a slowly dissolving impure liquid treating chemical is contained in the end of said container into which said impure liquid is introduced.

11. Reverse osmosis apparatus comprising a spiral wound membrane pack within a pressure resistant container, means for introducing impure liquid under pressure into one end of said container and into one end of said membrane pack, means for releasing brine from the other end of said membrane pack and said container and a porous central tube around which said membrane pack is wound and through which purified liquid is withdrawn, in which the improvements comprise: a collapsible soft plastic tube valve inside said porous central tube and connected to the purified water delivery pipe from said porous central tube thereby to shut off liquid flow therethrough in the event of a break in the membrane resulting in high volume, high pressure liquid flow into said porous central tube.

References Cited
UNITED STATES PATENTS

| | | | |
|---|---|---|---|
| 3,367,505 | 2/1968 | Bray | 210—321 |
| 3,369,667 | 2/1968 | Clark et al. | 210—321 X |

JAMES L. DE CESARE, Primary Examiner

U.S. Cl. X.R.

210—266, 321